Oct. 13, 1959  M. GERTEL  2,908,456

RESILIENT SUPPORTING DEVICE

Filed Aug. 16, 1954  2 Sheets-Sheet 1

Inventor,
Maurice Gertel,
by Dike, Thompson & Sanborn
Attys.

Oct. 13, 1959 — M. GERTEL — 2,908,456
RESILIENT SUPPORTING DEVICE
Filed Aug. 16, 1954 — 2 Sheets-Sheet 2

Inventor,
Maurice Gertel,
by Dike, Thompson & Sanborn
Attys.

United States Patent Office 2,908,456
Patented Oct. 13, 1959

2,908,456
RESILIENT SUPPORTING DEVICE

Maurice Gertel, Mattapan, Mass., assignor to Barry Controls Incorporated, a corporation of Massachusetts Application August 16, 1954, Serial No. 449,939

2 Claims. (Cl. 248—24)

This invention relates to devices for supporting equipment or machinery to reduce the transmission of vibration, shock and noise. More particularly, it relates to resilient supporting devices adapted for use between the mounting feet of industrial machinery and the floors of industrial plants in which the machinery is used. Such supporting devices are sometimes referred to as isolators. Industrial machinery of the type referred to here includes punch presses, shears, lathes, grinders, forging hammers, and similar machinery. Some of the principal advantages derived from the provision of resilience in supporting devices for such machinery are set forth below.

The effectiveness of a delicate and sensitive machine may be impaired if it is mounted in a buiding that experiences shock and vibration from the operation of other machines or from the movement of vehicles in the building or on the streets adjacent to the building. If such machines are supported by properly designed isolators, they usually will not be affected by the vibration and shock in the building.

The operation of certain types of industrial machines tends to create excessive vibration and shock in the building which houses the machine. If such machines are mounted upon properly designed isolators, the building as well as adjacent machinery will be protected from the disturbances caused by these machines. This results in less building maintenance and in better operation of adjacent machines.

Industrial machinery tends to be noisy. The noise generally is radiated both from the machine itself and from the walls, floors and ceilings of the building. Noise is radiated from such building structures because the structures vibrate as a result of dynamic forces originating in operation of the machine. The mounting of noisy machinery upon isolators tends to reduce the noise level in the plant, particularly with respect to those components of the noise that are radiated from the building structure, by reducing the vibration of such structure.

Many types of machinery, if rigidly supported, must be bolted or lagged to the floor if their positions are to remain fixed. Machines supported on resilient supports often do not need to be bolted to the floor to maintain their positions fixed because the resilient supports isolate the forces between the machine and the floor, thereby eliminating the condition which tends to move the machines over the floor. Elimination of the need for bolting a machine to the floor reduces the cost of installing the machine by eliminating the need of drilling mounting holes in a concrete floor. A further advantage in the elimination of the hold-down bolts is that the machines are given mobility. It then becomes possible to move and interchange machines at will and to maintain the production line equipped with the most effective machines for the operation being performed at a given time.

In machines of the type equipped with dies and using impact forces to cut metal, such as punch presses and shears, very large forces are imposed upon the dies. In a rigidly mounted machine, the forces tend to a maximum because the base of the machine is rigidly supported by the floor of the building. If the machine is mounted upon resilient supports, the base of the machine deflects slightly under the influence of forces applied to the dies. This reduces the magnitudes of such forces and decreases the wear on the dies. Maintenance costs on the dies as well as on the entire machine are thus reduced as a result of this reduction in forces on the dies.

The requirements of resilient supports for achieving the above-mentioned benefits vary substantially with different types of applications. In the isolation of vibration of low frequency, for example, it is necessary that the resilient support sustain a relatively great deflection under the static load of the supported machine. In the isolation of certain types of shock it is required that the resilient support experience a large dynamic deflection. To meet these requirements, the resilient supporting device described herein employs coil springs as the resilient load supporting elements.

For the proper isolation of vibration and shock in certain applications, it is necessary to control the natural frequencies of the supported equipment in the several natural modes of vibration. Such control is attained by proper positioning of the resilient supports and by adjustment of the horizontal and vertical stiffnesses of the supports. In certain applications, the supported machinery includes means to generate relatively great horizontal forces, and it is required in such circumstances that the resilient supports embody adequate horizontal stiffness for resisting the large horizontal forces originating in the supported machinery. The resilient supporting device described herein embodies resilience in both the vertical and horizontal directions, and includes means to adjust the relative values of these stiffnesses to attain the above advantages.

When resilient supports are installed under machinery, problems arise if the floor is uneven or if the weight of the supported machinery is unequally distributed among the various supports. Either of these conditions may cause the supported machinery to assume an inclined position, thereby introducing either an over-load or an underload on certain of the resilient supports. All of these difficulties can be eliminated by making the height of the resilient supporting device adjustable. The resilient supporting device described herein includes a height adjustment feature in combination with a resilient load supporting element. It thus becomes possible to maintain the supported machinery in a level position on resilient supports, even though the floor is uneven and the weight distribution of the machine is eccentric.

An object of my invention is to provide a resilient support or isolator capable of sustaining a relatively great static deflection, thereby making it possible to achieve a natural frequency that is sufficiently low to realize certain of the advantages set forth in the above paragraphs.

Another object of my invention is to provide a resilient support comprised substantially of standard structural members but embodying resilient elements that are readily interchangeable so that the stiffness of the support may be varied readily. This feature makes it possible to apply the resilient support to a variety of industrial machines.

Another object of my invention is to provide a resilient support having freedom of motion in all directions. In certain types of machinery, the forces involved in operation of the machine are in the vertical direction while in other types of machines the forces are in the horizontal direction. Many commercially available isolators have freedom of motion in only the vertical direction. An isolator, to be effective under all circumstances, should have freedom of motion in all directions.

A further object of my invention is to provide a resilient support with damping. Damping constitutes means to dissipate energy during deflection of the isolator and functions to limit the overall motion of the supported machine. A still further object is to provide a support with damping which is operative for all directions of motion and such a support which includes means to vary the degree of damping is necessary to achieve optimum operation of the machine. A further object is to provide means for modifying the degree of damping by a simple adjustment at the time the resilient support is applied.

A further object of my invention is to incorporate into a resilient supporting device means to limit the motion of the mounted machine in any direction. A still further object is to introduced resilience into the limiting or snubbing means which prevents excessive motion of the mounted machinery.

A still further object of my invention is to provide a resilient supporting device arranged so that the operating height of the device may be modified at will during installation of the support under the machinery. This makes it possible to readily compensate for uneven floor surfaces and for uneven distribution of the weight of the machine among the supports.

Other objects and advantages of my invention will be apparent from the following description by referring to the accompanying drawings in which.

Figure 1:
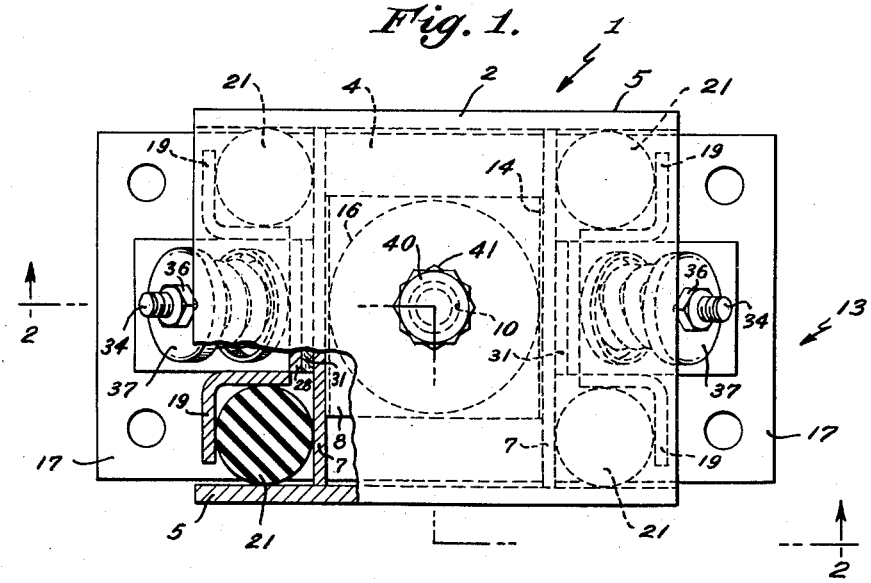
Fig. 1 is a plan view of one embodiment of my invention, one corner of the upper member being broken away.
Figure 2:
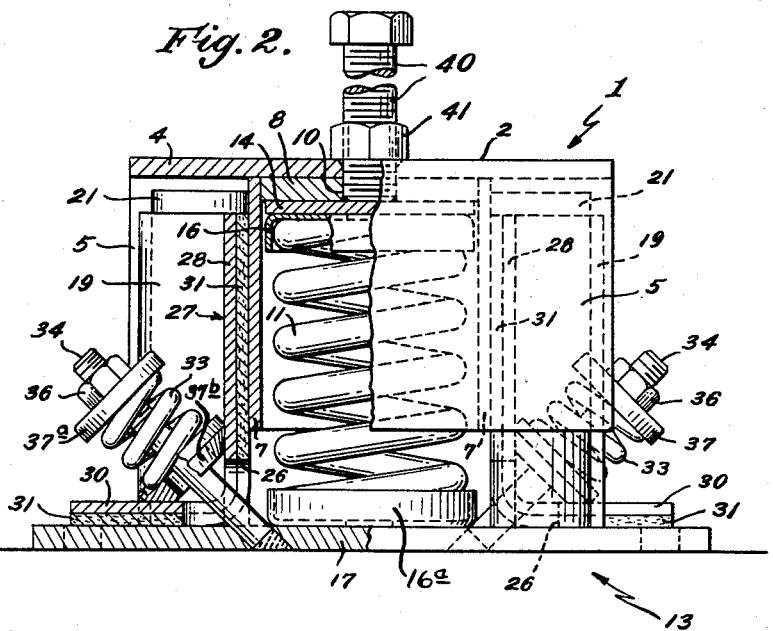
Fig. 2 is an elevation view in partial section of the embodiment illustrated in Fig. 1, the section being taken on line 2—2 of Fig. 1.

The resilient supporting device is comprised of upper and lower members with suitable resilient load supporting elements and damping means interposed therebetween as will be hereinafter described. Referring to Figs. 1 and 2, the upper member 1 is in the form of an inverted channel 2, having a horizontal web 4 with depending flanges 5. The channel 2 is provided with cross walls 7 extending transversely of the channel and spaced inwardly from the ends thereof. The part of the channel web 4 between the spaced cross walls 7 is preferably reinforced by the addition of an auxiliary plate 8 and the center of the web 4 is provided with a tapped hole 10 extending through both the web 4 and the auxiliary plate 8. The resilient load carrying element is in the form of a coil spring 11 supported at its lower end on the lower member 13 and engaging at its upper end a rigid piece 14 interposed between the spring 11 and the auxiliary plate 8. An inverted cup 16 is rigidly attached to the rigid piece 14 for locating the upper end of the spring.

The lower member 13 is comprised of a substantially flat plate 17 to which is attached, preferably by welding, four upstanding angles 19, one adjacent to each of the four corners of the plate 17. A cup 16a is also rigidly attached to the plate 17 for locating the lower end of the spring.

When the upper and lower members are nested together as illustrated in Figs. 1 and 2, four cavities are formed one adjacent to each corner, each cavity being formed by an angle 19, the adjacent flange 5 of the upper channel and the adjacent cross-wall 7 associated with the upper channel. These cavities are illustrated in Fig. 1. Each cavity houses a resilient member 21, of a form to be hereinafter described, which functions as a cushioned limiting or snubbing device to restrict relative movement between the upper and lower members in any direction.

In the embodiment illustrated in Figs. 1 and 2, the resilient member 21 is in the form of a solid cylinder made of natural or synthetic rubber. The diameter of the cylinder is such that it fits snugly in the cavity defined by the angle 19, the flange 5, and the cross-wall 7. The length of the cylinder is substantialy equal to but preferably slightly less than the distance between the plate 17 of the lower member 13 and the web 4 of the channel 2 forming the upper member 1. The length of the cylinder 21 is also greater than the height of the upstanding angle 19 so that the upper portion of the cylinder extends above the upper edge of the angle 19 as shown in Fig. 2. Downward movement of the upper member 1 with respect to the lower member 13 is thus resisted by compression of the cylinder along its vertical axis. Horizontal movement of the upper member 1 with respect to the lower member 13 in any direction is resisted by compression of the rubber cylinder 21 along a diameter of the cross section as shown in Fig. 1.

Figure 3:
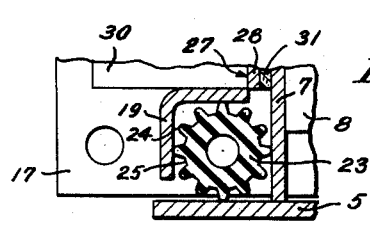
Fig. 3 is a view similar to a portion of Fig. 1 showing a modified form of the invention.

Under certain circumstances, the resilient member 21 shown in Fig. 1 has a horizontal stiffness which is too great. This may occur when the application requires a relatively low horizontal stiffness compared with the vertical stiffness. Under such circumstances, the modified form of resilient member 23 illustrated in Fig. 3 may be employed. This member has substantially the same over-all dimensions as the resilient member 21 illustrated in Figs. 1 and 2. The center of the member 23 is hollow, however, to attain a lower stiffness when subjected to a diametral force. The exterior surface is provided with alternating ridges 24 and grooves 25 intended to accomplish the same general purpose.

In the embodiment shown in Figs. 1 and 2, two dampers are provided, one adjacent to each end of the device. Each damper consists of an angle shaped member 27 whose vertical leg 28 lies parallel with a cross-wall 7 and whose horizontal leg 30 lies parallel with the horizontal plate 17 of the lower member 13. The inner faces of the damper member 27 are lined with friction material 31, such as brake lining, preferably cemented or otherwise secured thereto. The damper member 27 is yieldingly urged against the engaging faces of the members 7 and 17 by a diagonally disposed coil spring 33 encircling a rod 34 preferably welded to the lower plate 17 and extending through an aperture 26 in the damper member 27 at the intersection of the vertical (28) and horizontal (30) legs. The upper end of the spring engages the bearing cap 37a and the lower end engages the member 37b. The magnitude of the force exerted by the friction material against the structures 7 and 17 is adjusted by turning the nut 36 which engages the bearing cap 37a.

Damping is provided by rubbing of the friction material 31 on adjacent structures 7, 17. The damper member 27 fits snugly between the two upstanding angles 19 and is thereby constrained against movement relative to the base plate 17 with respect only to motion crosswise of the upper channel 2. Motion of the upper member in this cross-wise direction as well as in the vertical direction is damped by rubbing of the friction material 31 against the outer face of the cross-wall 7. Motion of the upper member in a direction lengthwise of the channel is damped by rubbing of the friction material on the upper surface of the lower plate 17. The load carrying resilient element 11 thus permits motion freely in any horizontal or vertical direction, while the friction damper supplies damping for any of these directions without interfering with the freedom of motion.

The mounted equipment is attached to the resilient supporting device by the center bolt 40. The method of application includes jacking up the equipment and sliding the device under the equipment until the central tapped hole 10 is aligned with the hole in the mounting foot of the equipment. The bolt 40 with the nut 41 threaded thereon is then inserted through the mounting hole of the machine and threaded into the tapped hole 10 in the upper member 1. Threading the bolt 40 through the upper member 1 forces the rigid piece 14 downward with respect to the web 4 of the upper channel 2. Inasmuch as the loaded height of the coil spring 11 is determined by the weight of the mounted equipment, the overall height of the device is adjusted by turning the bolt 40, until the machine reaches the desired height. The nut 41 is then threaded down onto the top of the mounting foot of the machine and the adjusted height of the device is thus locked.

Figure 4:
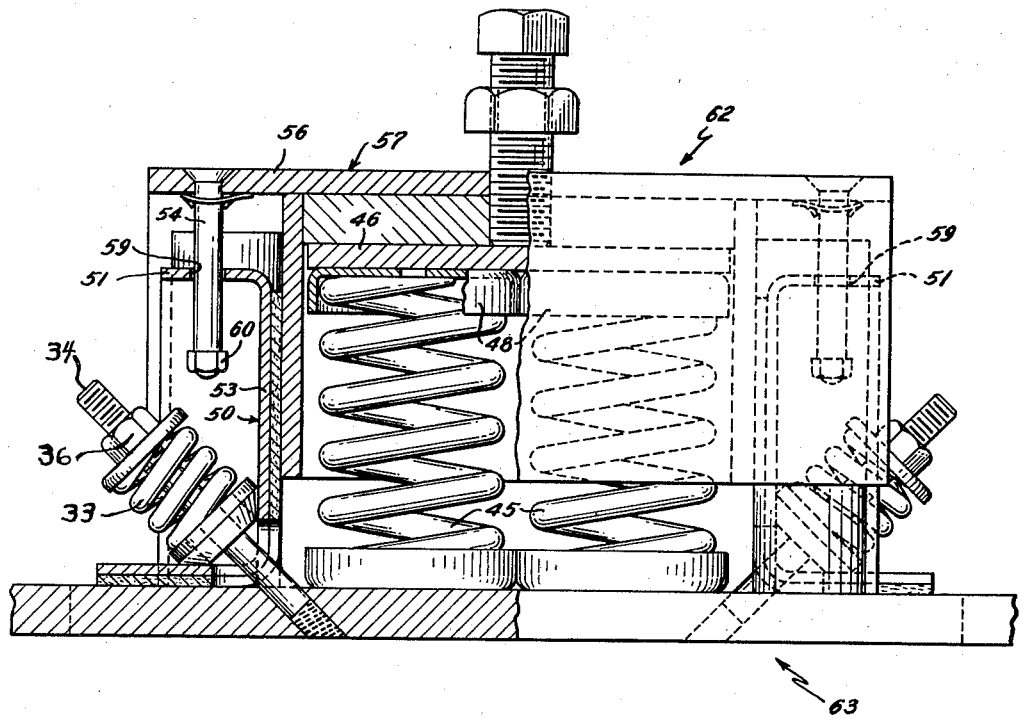
Fig. 4 is a view similar to Fig. 2 showing a modified form of the invention in which a plurality of resilient coil springs are used to support the dead weight load.

In the embodiment shown in Fig. 4, the methods of construction, operation and adjustment are similar to those of the embodiment illustrated in Figs. 1 and 2. Whereas the embodiment illustrated in Figs. 1 and 2 includes a single spring 11 and is intended for supporting relatively light machinery, the embodiment illustrated in Fig. 4 includes four springs 45 arranged in a square pattern when viewed from above and is intended for the support of somewhat heavier machinery. It should be understood that the embodiment illustrated in Fig. 4 is not limited to the use of four springs, but may include as few as two springs, or as many as nine or more springs. When different numbers of springs are used, the over-all dimensions of the device are modified to accommodate the required number of springs. It is also contemplated to use springs of different stiffnesses, thereby making it possible to vary the load-carrying capacity of the resilient support by changing both the stiffnesses of the individual springs and the number of springs. When multiple springs are used, the rigid member 46 which overlies the springs 45 is made of sufficient thickness and area to cover the tops of all springs and is provided with inverted cups 48 to locate the tops of the springs.

In the embodiment illustrated in Fig. 4, the angle shaped member 50 forming a part of the damper includes an outwardly directed flange 51 formed preferably integral with the upper end of the vertical leg 53. A rod 54 fixed to and depending from the web 56 of the upper channel shaped member 57 extends through an enlarged opening 59 in the flange 51. The rod 54 is fixed to the web 56 by a suitable attachment and is provided with a nut 60 or other type of head-like member at its lower end. This construction functions in the following manner to prevent accidental disassembly of the upper member 62 from the lower member 63. The angle shaped member 50 is movably attached to the lower member 63 by the assembly which includes spring 33, rod 34 and nut 36 and to the upper member 62 by the assembly which includes the flange 51, rod 54 and nut 60. This permits the upper (62) and lower (63) members to experience relative motion in all directions but insures that the resilient supporting device will not become disassembled if it is lifted by either the upper or lower members. It should be understood that the form of damper and retaining device illustrated in Fig. 4 is equally applicable to the embodiment illustrated in Figs. 1 and 2.

While I have shown and described several embodiments of the invention, it is to be understood that this disclosure is for the purpose of illustration only and that various changes in shape, proportion, and arrangement of parts, and the substitution of equivalent elements may be made without departing from the spirit or scope of the invention as set forth in the appended claims.

I claim:

1. A vibration isolator having spaced apart upper and lower members with resilient load carrying means interposed therebeteween, one of said members having a web and depending flanges, spaced vertical walls extending between said flanges on opposite sides of said resilient means, at least one angle shaped damper having a vertical leg frictionally engaging one of said walls and a horizontal leg frictionally engaging the other of said members and means for yieldingly urging said vertical leg into frictional engagement with said wall and said horizontal leg into frictional engagement with said other member, said last mentioned means comprising an angularly disposed rod extending from said other member through an aperture in said damper in the vicinity of the juncture of said legs, a coil spring on said rod arranged to urge said damper against said wall and other member.

2. A vibration isolator having spaced apart upper and lower members with resilient load carrying means interposed therebetween, one of said members having spaced vertical walls extending toward said other member on opposite sides of said resilient means, at least one angle shaped damper having a vertical leg frictionally engaging one of said walls and a horizontal leg frictionally engaging the other of said members and means for yieldingly urging said vertical leg into frictional engagement with said wall and said horizontal leg into frictional engagement with said other member, said last mentioned means comprising an angularly disposed rod extending from said other member through said damper and between said legs, a spring on said rod arranged to urge said damper against said wall and other member.

References Cited in the file of this patent

UNITED STATES PATENTS

| | | |
|---|---|---|
| 1,734,596 | Rosenzweig | Nov. 5, 1929 |
| 1,826,126 | Delahanty | Oct. 6, 1931 |
| 2,068,996 | Smith | Jan. 26, 1937 |
| 2,084,638 | Goodwin | June 22, 1937 |
| 2,466,480 | Rosenzweig | Apr. 5, 1949 |
| 2,683,015 | Campbell | July 6, 1954 |
| 2,687,295 | Tucker | Aug. 24, 1954 |